(12) United States Patent
Iwasaki (10) Patent No.: US 6,964,016 B2
(45) Date of Patent: *Nov. 8, 2005

(54) METHOD OF PAGINATING PRINTED MATERIAL

(75) Inventor: Taiji Iwasaki, Minamiashigara (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 534 days.

(21) Appl. No.: 09/081,141

(22) Filed: May 19, 1998

(65) Prior Publication Data

US 2001/0039554 A1 Nov. 8, 2001

(30) Foreign Application Priority Data

May 19, 1997 (JP) .............................................. 9-128956

(51) Int. Cl.⁷ .......................... G06F 15/00; G06F 17/21; B42D 17/00
(52) U.S. Cl. ...................... 715/517; 715/525; 715/537; 270/1; 281/2; 281/46; 358/1.15
(58) Field of Search ................................ 707/517, 537, 707/525; 270/1; 281/2, 46; 358/1, 1.15; 364/419.01; 283/62; 715/517, 525, 537

(56) References Cited

U.S. PATENT DOCUMENTS

| | | | | |
|---|---|---|---|---|
| 4,270,773 A | * | 6/1981 | Gaetano ........................ | 283/34 |
| 4,524,993 A | * | 6/1985 | Walker-Taylor ............... | 281/46 |
| 4,538,833 A | * | 9/1985 | Trikilis ........................... | 281/2 |
| 4,648,067 A | * | 3/1987 | Repass et al. ................. | 707/537 |
| 4,900,001 A | * | 2/1990 | Lapeyre ....................... | 270/1.01 |
| 5,241,474 A | * | 8/1993 | Morovac ................ | 364/419.01 |
| 5,390,354 A | * | 2/1995 | De Heus et al. ............. | 707/517 |
| 5,495,561 A | * | 2/1996 | Holt ........................... | 358/1.15 |
| 6,158,777 A | * | 12/2000 | Twardosz ..................... | 283/62 |

FOREIGN PATENT DOCUMENTS

| | | |
|---|---|---|
| JP | 60-196760 A | 10/1985 |
| JP | 04-136848 A | 5/1992 |
| JP | 877336 | 3/1996 |
| JP | 09-109356 A | 4/1997 |

OTHER PUBLICATIONS

Weinmann, Elaine, Visual Quickstart Guide QuarkXPress 3.2 For Macintosh, 1993 PeachPit Press, Inc., pp. 54–57.*
Rada, Roy, Converting a textbook to hypertext, ACM Transactions on Information Systems, vol. 10, issue 3, pp. 294–315, Jul. 1992.*

* cited by examiner

Primary Examiner—William L Bashore
(74) Attorney, Agent, or Firm—Sughrue Mion, PLLC (57) ABSTRACT

A printed material to be folded a plurality of times is paginated by displaying an unfolded leaf and assigning page numbers to pages on the face and back of the unfolded leaf through computer processing. The number of rectangles corresponding to the number of pages in a matrix is designated on each of the face and back of the unfolded leaf. One of the rectangles is determined as a 1st page on either one of the face and back of the unfolded leaf, and the rectangle on the reverse side which corresponds to the 1st page is determined as a 2nd page. One of the rectangles which will face the 2nd page when the leaf is folded once is determined as a 3rd page. The rectangle on the reverse side which corresponds to the 3rd page is determined as a 4th page. One of the rectangles which will face the 4th page when the leaf is folded twice is determined as a 5th page, and the rectangle on the reverse side which corresponds to the 5th page is determined as a 6th page. One of the rectangles which will face the 6th page when the leaf is folded twice is determined as a 7th page, and the rectangle on the reverse side which corresponds to the 7th page is determined as an 8th page. An unfolded leaf can thus easily be paginated before it is folded, stitched, and cut into a book.

16 Claims, 13 Drawing Sheets

BACK

FIG. 5B

FACE

FIG. 6

FACE

FIG. 7A

BACK

FIG. 7B

FACE

BACK

FIG. 9

BACK

F I G.10A

BACK

F I G.10B

FACE

F I G.11

BACK

F I G.12

BACK

FIG.13A

| 1 | 16 | 13 | 4 |
|---|----|----|---|
|   |    |    |   |
|   |    |    |   |
| 8 | 6 | ZL | S |

—51

BACK

FIG.13B

| 3 | 14 | 15 | 2 |
|---|----|----|---|
|   |    |    |   |
|   |    |    |   |
| 6 | LL | OL | L |

—52

FACE

FIG.14

| 1 | 16 | 13 | 4 |
|---|----|----|---|
|   | LL |    |   |
|   |    |    |   |
| 8 | 6 | ZL | S |

—51

BACK

FIG.15A

| 1 | 16 | 13 | 4 |
|---|----|----|---|
| ZE | LL | OZ | 6Z |
| 25 | 24 | 21 | 28 |
| 8 | 6 | ZL | S |

L4 (pointing to upper-left area)
—51

BACK

FIG.15B

| 3 | 14 | 15 | 2 |
|---|----|----|---|
| OE | 6L | 8L | LE |
| 27 | 22 | 23 | 26 |
| 6 | LL | OL | L |

—52

FACE

METHOD OF PAGINATING PRINTED MATERIAL

BACKGROUND OF THE INVENTION

1. Field of the Invention

The present invention relates to a method of paginating a printed material to be folded, and more particularly to a method of paginating a printed material to be folded, which is applicable to an electronic page make-up system for generating color-separated final films using a display unit based on computer processing from individual subject images without using intermediate materials including layout sheets and line subject films pasted to those layout sheets.

2. Description of the Related Art

In a bookbinding process for producing a printed text comprising a plurality of pages, e.g., a book, printed sheets are mechanically folded by a folder.

Before printed sheets are folded, it is necessary that the printed sheets be paginated, i.e., assigned page numbers.

Figure 24A:
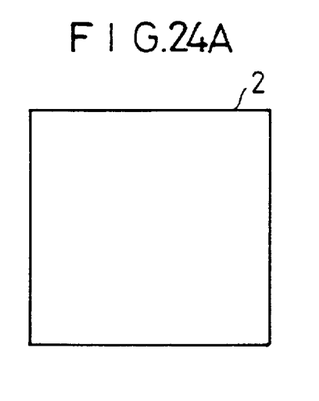
FIG. 24A is a plan view of a printed leaf.

One process of paginating printed sheets will be described below with reference to FIGS. 24A through 24E. As shown in FIG. 24A, a printed sheet 2 which is to be folded is displayed on a display screen. The printed sheet 2 is referred to as a leaf having two face and back pages.

Figure 24B:
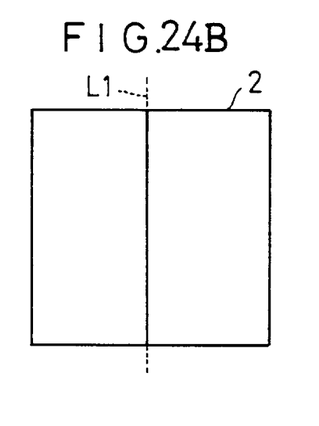
FIG. 24B is a plan view showing the manner a fold line is determined for the printed leaf shown in FIG. 24A.
Figure 24C:
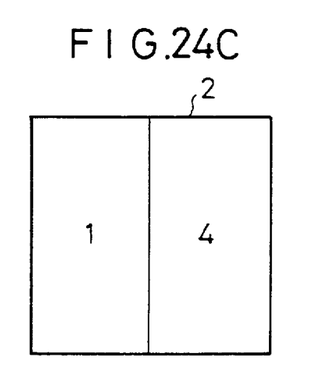
FIG. 24C is a plan view showing the manner in which 1st and 4th pages are assigned to the printed leaf shown in FIG. 24A.
Figure 24D:
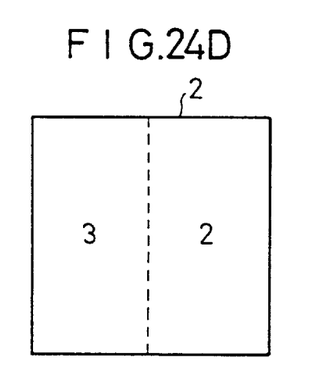
FIG. 24D is a plan view showing the manner in which 2nd and 3rd pages are assigned to the printed leaf shown in FIG. 24A.

Based on folding specifications (it is assumed that the leaf 2 is to be folded into four pages of an openable-to-the-right book), a fold line L1 is entered to generate four rectangles on the leaf 2, as shown in FIG. 24B. Then, the four rectangles are paginated, i.e., assigned first, second, third, and fourth pages, according to the folding specifications, as shown in FIGS. 24C and 24D. The folding specifications contain pages for the respective rectangles, which make up the face and back of the leaf. The term "openable-to-the-right book" means a book whose pages are turned from left to right by the reader when the reader reads the book in the normal direction. In the openable-to-the-right book, characters are printed in vertical arrays on each of the pages.

Figure 24E:
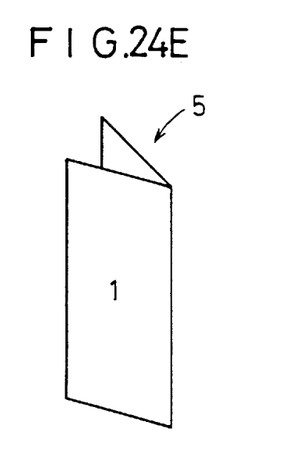
FIG. 24E is a perspective view of an openable-to-the-right book of four pages.

When the printed sheet 2 is folded about the fold line L1 by placing the right-hand side over the left-hand side thereof in FIG. 24D, an openable-to-the-right book 5 of four pages is completed as shown in FIG. 24E. The term "book" used herein means not only books, but also printed texts which are folded, including pamphlets, brochures, booklets, etc. Usually, books of many pages are stitched and then cut after the pages are folded.

If an A6-size book of 32 pages is to be produced, an A2-size leaf is prepared. In a pagination process, each of the face and back of the leaf needs to be assigned 16 pages (16 rectangles), and hence the leaf as a whole needs to be assigned 32 pages. The worker effects the pagination process by seeing folding specifications including a table of rectangles and page numbers, pointing all the rectangles with a mouse, and entering page numbers. The pagination process is therefore highly tedious and time-consuming to carry out.

SUMMARY OF THE INVENTION

It is therefore an object of the present invention to provide a method of paginating a printed material to be folded, so that page numbers to be assigned can be entered highly easily.

Another object of the present invention to provide a method of paginating a printed material to be folded by entering page numbers to be assigned, so that fold lines can automatically be determined.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Like or corresponding parts are denoted by like or corresponding reference numerals throughout views.

Figure 1:
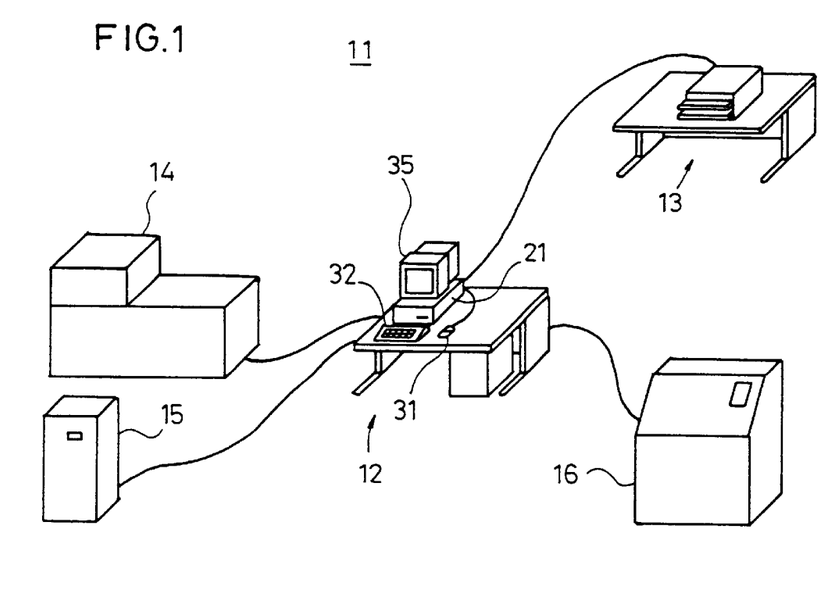
FIG. 1 is a schematic perspective view of an electronic page make-up system to which the principles of the present invention applied.

FIG. 1 shows an electronic page make-up system to which the principles of the present invention applied, the electronic page make-up system being disclosed in Japanese laid-open patent publication No. 8-77336 (Japanese patent application No. 6-236025).

As shown in FIG. 1, the electronic page make-up system, generally designated by the reference numeral 11, has a workstation 12 comprising a computer. The workstation 12 may be replaced with a personal computer capable of computer processing.

To the workstation 12, there is connected a proof printer 13 for printing proofs of relatively low image quality at a relatively low cost.

To the workstation 12, there are also connected a layout sheet data entering device 14, a color scanner 15, and a film printer 16.

The layout sheet data entering device 14 reads a layout sheet and supplies layout sheet data to the workstation 12. The color scanner 15 reads a monochromatic or color image of picture patterns, characters, figures, etc. from a subject, and supplies color-separated image data to the workstation 12. Layout sheet data supplied from the layout sheet data entering device 14 and color-separated image data supplied from the color scanner 15 are stored in given storage areas on a recording medium such as a hard disk or the like of the workstation 12.

The workstation 12 displays an image of the layout sheet based on the supplied layout sheet data on the display screen of a display unit 35. The operator of the workstation 12 electronically imposes the displayed image on the display unit 35 to generate imposed page data including individual page data and one-page page data.

The workstation 12 paginates imposed page data (individual page data), i.e., assign page numbers to the page data, thereby to complete the assignment of page numbers to the face and back of a leaf, and generates imposed pattern data including the page data.

It is assumed that the imposed pattern comprises a total of 32 pages with 16 pages assigned to each of the face and back of the leaf.

Figure 2:
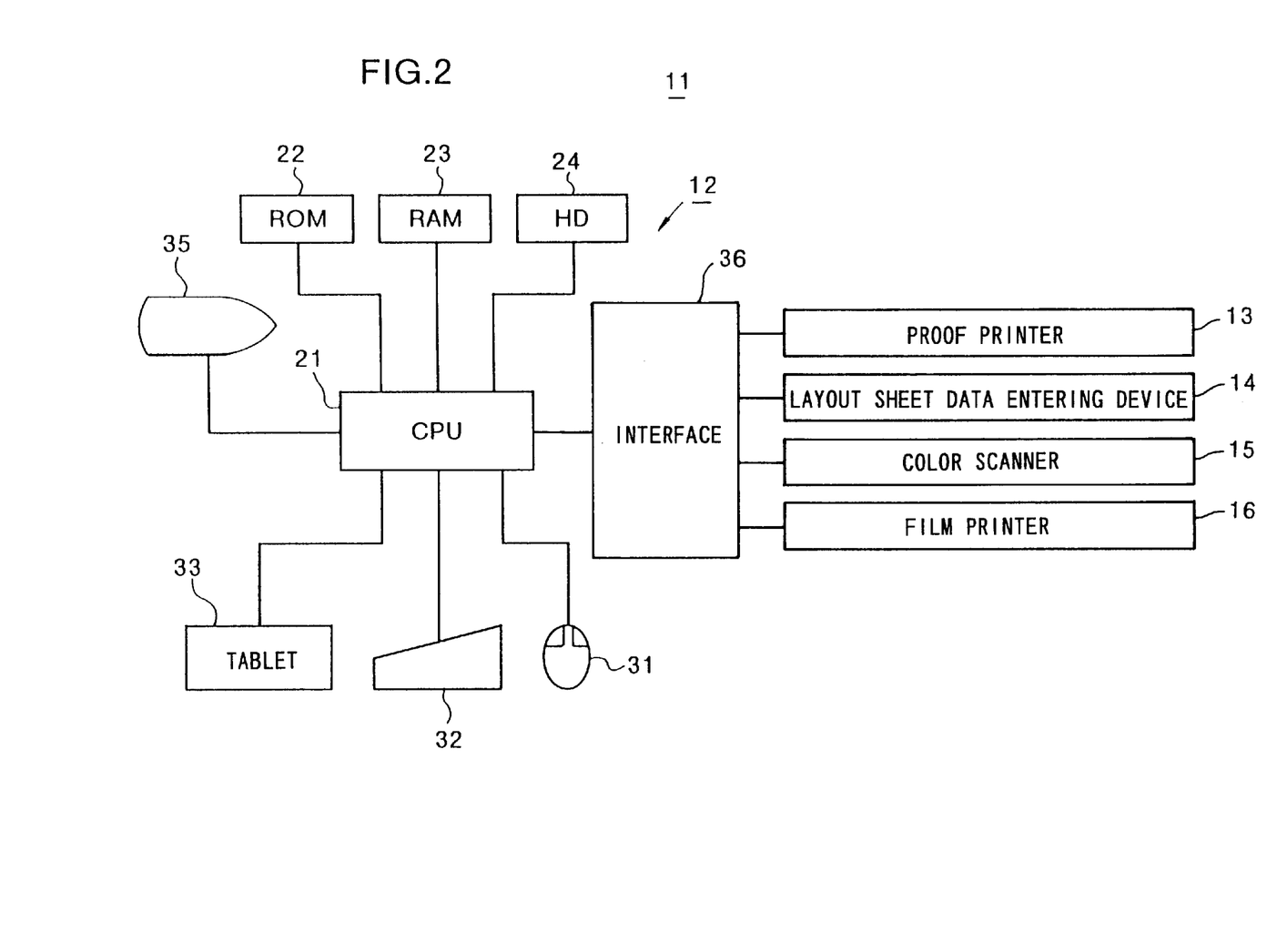
FIG. 2 is a block diagram of a workstation of the electronic page make-up system shown in FIG. 1.

FIG. 2 shows in block form the workstation 12 shown in FIG. 1 As shown in FIG. 2, the workstation 12 comprises a CPU (Central Processing Unit) 21 serving as control means, processing means, and paginating means. The CPU 21 is connected to a ROM (Read-Only Memory) 22 which stores a system program and other data, a RAM (Random-Access Memory) 23 serving as a work memory for storing temporary data, and an HD (Hard Disk) 24 for storing an imposition application program (including a pagination application program) and various data including imposed pattern data, image data, etc.

The CPU 21 is also connected to a mouse 31, a keyboard 32, and a tablet 33, each serving as a data entry unit and a pointing device, and a display unit 35 such as a CRT or the like for displaying images.

The proof printer 13, the layout sheet data entering device 14, the color scanner 15, and the film printer 16 are connected to an interface 36 which is connected to the CPU 21. An editing workstation (not shown) can be connected to the workstation 12 through a communication interface such as Ethernet or the like.

Figure 3:
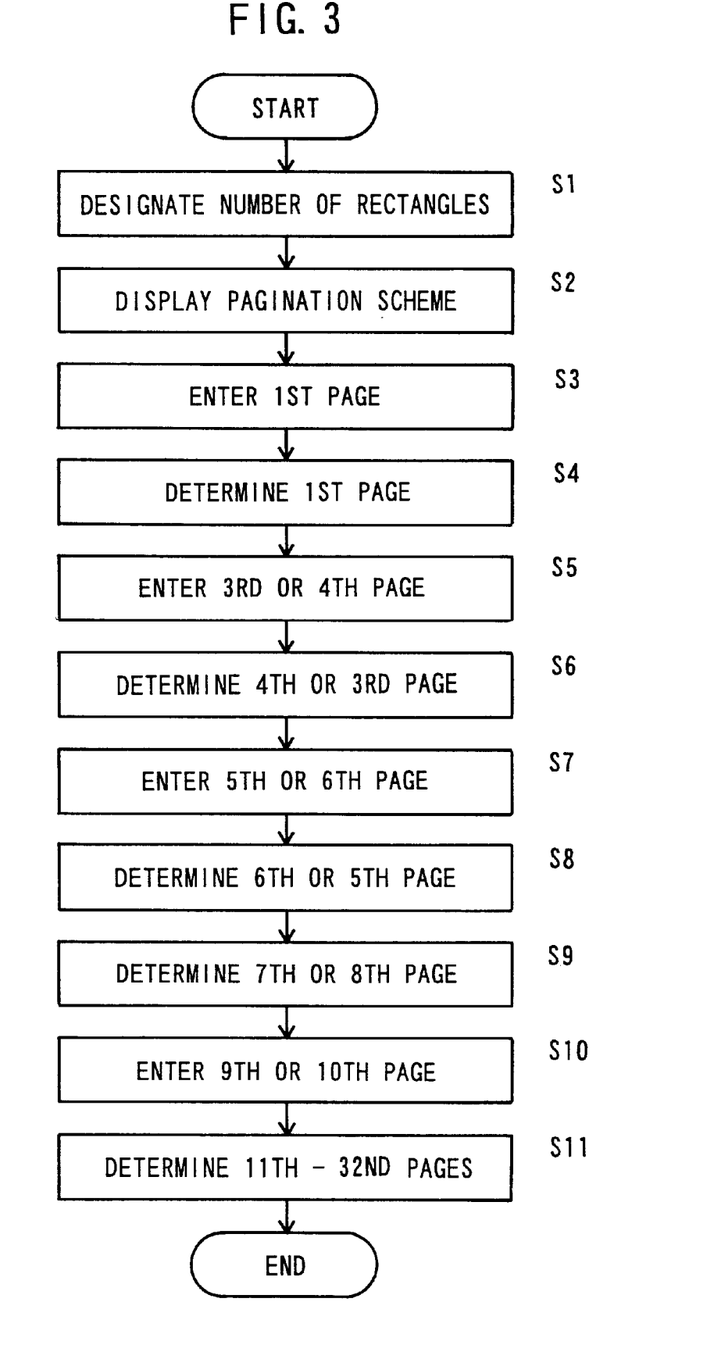
FIG. 3 is a flowchart of a processing sequence executed by the workstation.

A processing sequence executed by the workstation 12 will be described below with reference to FIG. 3. Unless specifically indicated otherwise, the CPU 21 performs control functions. In FIG. 3, numbers with a prefix S represents step numbers.

It is assumed that a leaf is to be paginated for a total of 32 A6-size pages (16 pages on each of the face and back of the leaf) according to a first embodiment of the present invention, and that the pages are to be turned from left to right, i.e., the resultant book is openable to the right. In openable-to-the-right books, characters are usually printed in vertical arrays, as described above.

The leaf to be paginated is of an A2 size. First, the number of rectangles corresponding to the number of pages in a matrix of 4×4 (4 in a vertical direction and 4 in a horizontal direction) is designated for one side of the A2-size leaf by the operator in step S1. When the A2-size leaf is folded once, it provides a total of 4 A3-size pages. When the A2-size leaf is folded twice, it provides a total of 8 A4-size pages. When the A2-size leaf is folded three times, it provides a total of 16 A5-size pages. When the A2-size leaf is folded four times, it provides a total of 32 A6-size pages.

The leaf is folded according to the following rules: The leaf is folded from right to left by the folder. That is, if the leaf is of a horizontally elongate rectangular shape, then the leaf is folded about a vertical central line thereon, bringing the face of the right-hand half over the face of the left-hand half. For example, if the leaf is folded once into an openable-to-the-right book, the back of the right-hand half serves as a 1st page, the face of the right-hand half as a 2nd page, the face of the left-hand half as a 3rd page, and the back of the left-hand half as a 4th page. These rules are stored as a folding algorithm in the HD 24. The principles of the present invention are also applicable when a leaf is folded otherwise, e.g., from left to right.

Figure 4A:
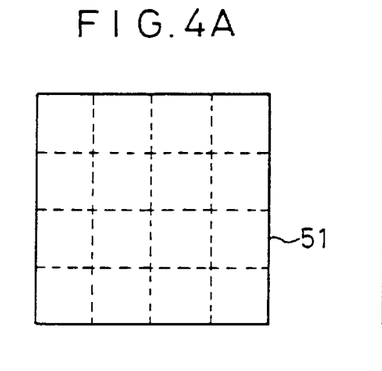
FIG. 4A is a diagram of a pagination scheme for the face of a leaf.
Figure 4B:
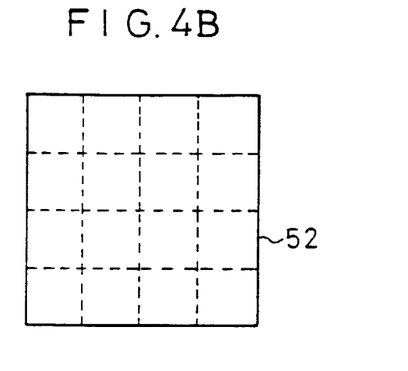
FIG. 4B is a diagram of a pagination scheme for the back of a leaf.

When the number of rectangles is designated by the operator in step S1, a pagination scheme 51 as shown in FIG. 4A is displayed on the display screen of the display unit 35 in step S2. The display screen of the display unit 35 is capable of simultaneously displaying a pagination scheme 52 as shown in FIG. 4B, which is a rear view of the pagination scheme 51. Alternatively, the display screen of the display unit 35 can selectively display the pagination scheme 51 or the pagination scheme 52.

Figure 5A:
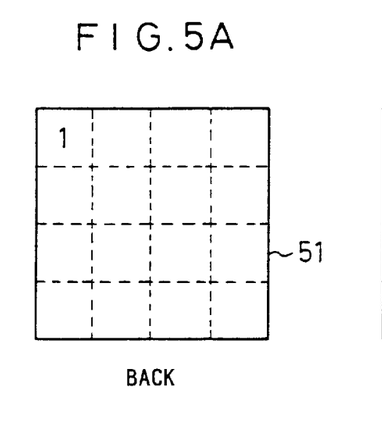
FIG. 5A is a diagram of a pagination scheme in which a 1st page is assigned.
Figure 5B:
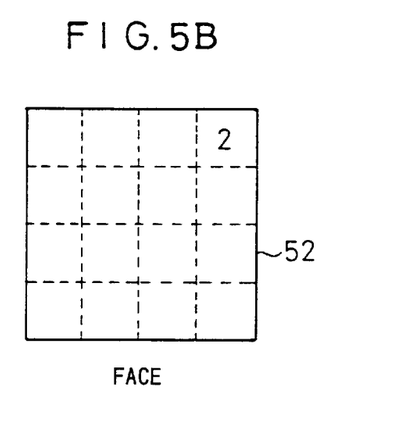
FIG. 5B is a diagram of a pagination scheme in which a 2nd page is assigned.

The operator selects a desired one of the rectangles on the pagination scheme 51 as a 1st page with the mouse 31 in step S3, as shown in FIG. 5A. When the desired rectangle is thus selected as the 1st page, the 1st page is determined as being on the back of a leaf, and the characters "BACK" are displayed on the display unit 35. At this time, the rectangle on the reverse side which corresponds to the rectangle selected as the 1st page, i.e., the corresponding rectangle on the pagination scheme 52, is automatically determined as a 2nd page in step S4, as shown in FIG. 5B. The operator may select any rectangle on the pagination scheme 51 as the 1st page. Since the leaf is folded from right to left, the 1st page is automatically determined as being on the back of the leaf. However, the side of the 1st page may be selected as the face of the leaf.

Then, the operator designates a 3rd page or a 4th page in step S5. If the operator designates a 3rd page, then the operator selects a desired rectangle as the 3rd page which will face the 2nd page when the leaf is folded once. The rectangle on the reverse side which corresponds to the rectangle selected as the 3rd page is automatically determined as a 4th page in step S6.

Figure 6:
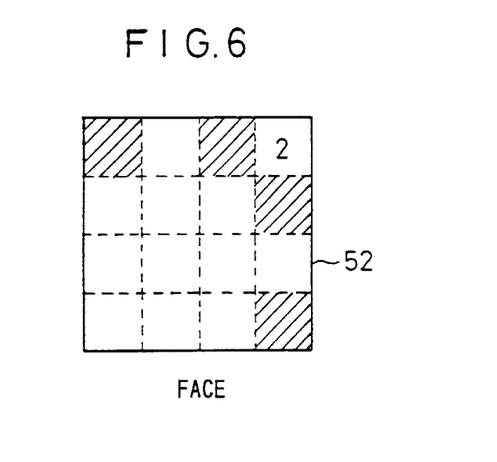
FIG. 6 is a diagram of a pagination scheme illustrating candidates for a 3rd page.

More specifically, in view of the fact that the leaf is folded from right to left by the folder, an either one of the rectangles which are shown hatched in FIG. 6 will face the 2nd page when the leaf is folded once. These rectangles are displayed as hatched or otherwise patterned candidates for the 3rd page, so that the operator can designate one of the hatched rectangles as the 3rd page. If the operator designates another rectangle than the hatched rectangles, then the CPU 21 displays a message "FOLDING IMPOSSIBLE, AND RECTANGLE CANNOT BE DESIGNATED" on the display unit 35.

Figure 7A:
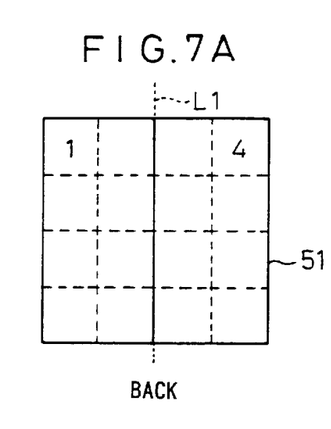
FIG. 7A is a diagram of a pagination scheme in which 1st and 4th pages are assigned.
Figure 7B:
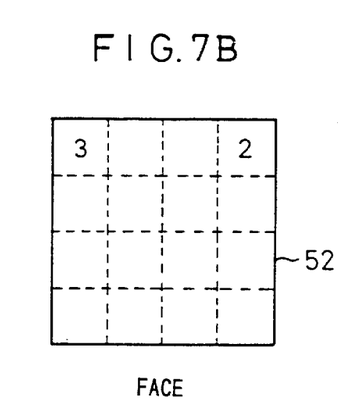
FIG. 7B is a diagram of a pagination scheme in which 2nd and 3rd pages are assigned.

It is assumed that the operator designates an upper left rectangle as a 3rd page, as shown in FIG. 7B. As shown in FIG. 7A, a fold line L1 for folding the leaf once is now automatically determined, and a 4th page is also automatically determined.

If the operator designates a 4th page in step S5, then the operator selects a desired rectangle as the 4th page which will face the 1st page across the 2nd page when the leaf is folded once.

Figure 7C:
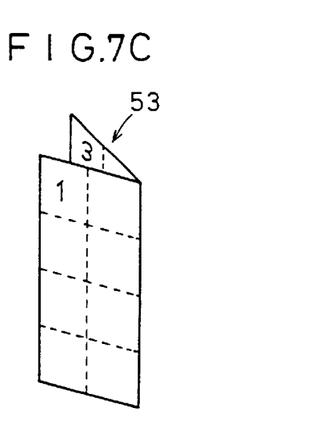
FIG. 7C is a diagram showing the image of a book folded once.

FIG. 7C shows a book 53 containing 1st, 2nd, 3rd, and 4th pages, produced when the leaf is folded once.

Figure 8:
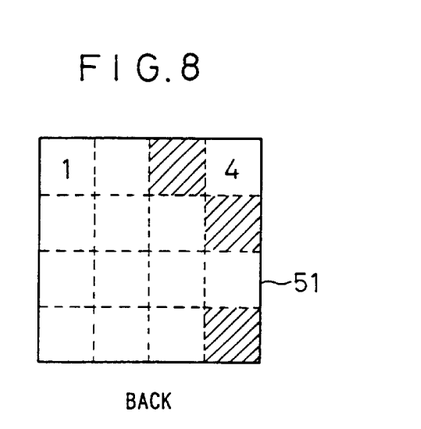
FIG. 8 is a diagram of a pagination scheme illustrating candidates for a 5th page.
Figure 9:
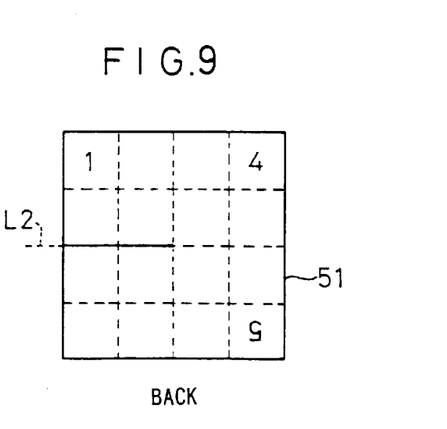
FIG. 9 is a diagram of a pagination scheme in which 1st, 4th, and 5th pages are assigned.

Then, the operator designates a 5th page or a 6th page in step S7. If the operator designates a 5th page, then the operator selects a desired rectangle (one of hatched rectangles shown in FIG. 8) as the 5th page which will face the 4th page when the leaf is folded twice. The rectangle on the reverse side which corresponds to the rectangle selected as the 5th page is automatically determined as a 6th page in step S8. It is assumed that the operator designates a lower right rectangle as a 5th page, as shown in FIG. 9. As shown in FIG. 9, a fold line L2 corresponding to a length, indicated by the solid line, of two rectangles, is now automatically determined. In view of the fact that the leaf is folded about the fold line L2, it can be seen that the 5th page be imposed in a 180°-rotated orientation.

If the operator designates a 6th page in step S7, then the operator selects a desired rectangle as the 6th page which will face the 3rd page across the 4th page when the leaf is folded twice. The rectangle on the reverse side which corresponds to the rectangle selected as the 6th page is automatically determined as a 5th page in step S8.

Figure 10A:
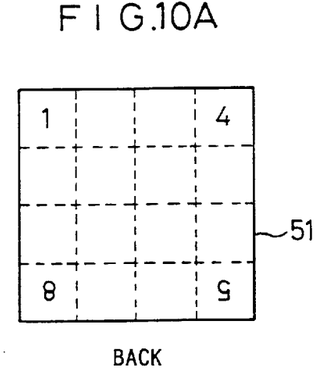
FIG. 10A is a diagram of a pagination scheme in which 1st, 4th, 5th, and 8th pages are assigned.
Figure 10B:
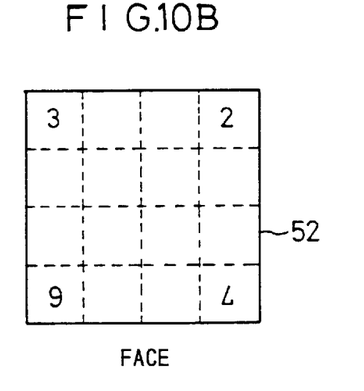
FIG. 10B is a diagram of a pagination scheme in which 2nd, 3rd, 6th, and 7th pages are assigned.

According to the processing in step S8, as shown in FIGS. 10A and 10B, a rectangle which will face the rectangle as the 6th page when the leaf is folded twice is determined as a 7th page, and the rectangle on the reverse side which corresponds to the rectangle selected as the 7th page is automatically determined as an 8th page in step S9.

Figure 11:
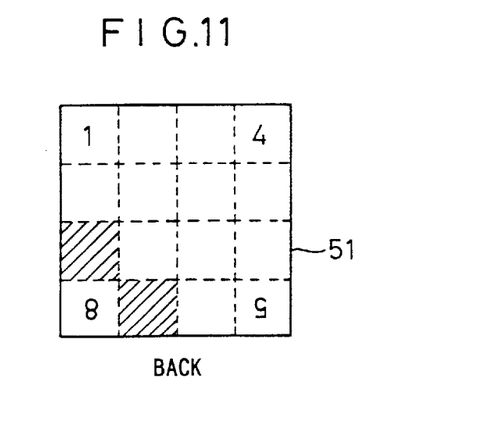
FIG. 11 is a diagram of a pagination scheme illustrating candidates for a 9th page.
Figure 12:
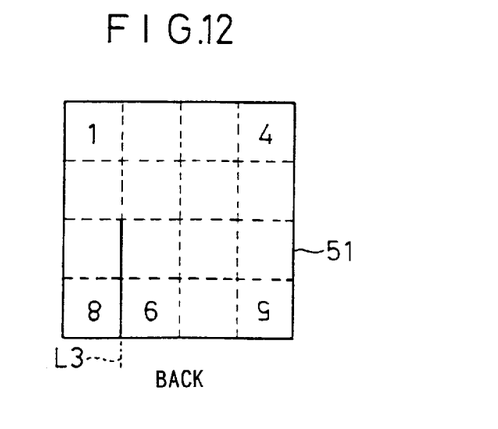
FIG. 12 is a diagram of a pagination scheme in which 1st, 4th, 5th, 8th, and 9th pages are assigned.

Thereafter, the operator designates a 9th page or a 10th page in step S10. If the operator designates a 9th page, then the operator selects a desired rectangle (one of hatched rectangles shown in FIG. 11) as the 9th page which will face the 8th page when the leaf is folded three times, as shown in FIG. 12. A fold line L3 is also determined, as shown in FIG. 12. The rectangle on the reverse side which corresponds to the rectangle selected as the 9th page is automatically determined as a 10th page.

Figure 13A:
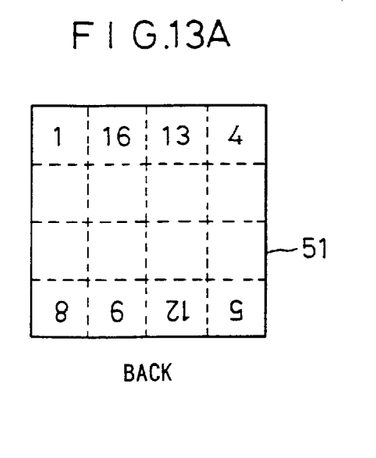
FIG. 13A is a diagram of a pagination scheme in which 1st, 4th, 5th, 8th, 9th, 12th, 13th, and 16th pages are assigned to the back of a leaf.
Figure 13B:
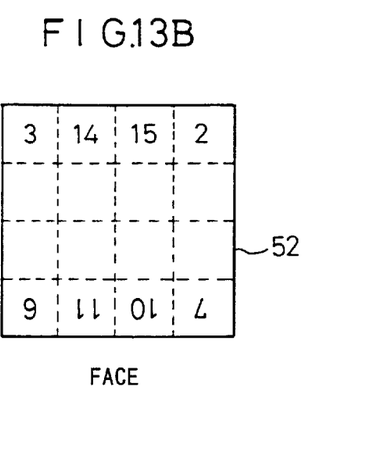
FIG. 13B is a diagram of a pagination scheme in which 2nd, 3rd, 6th, 7th, 10th, 11th, 14th, and 15th pages are assigned to the face of a leaf.
Figure 14:
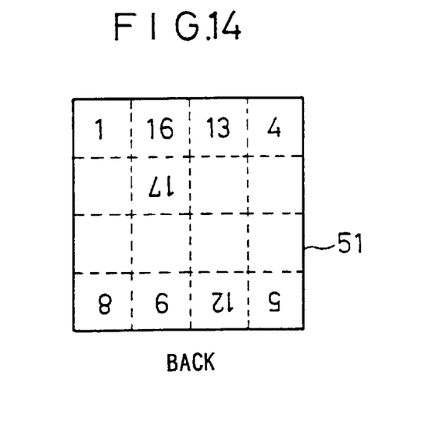
FIG. 14 is a diagram of a pagination scheme in which 1st, 4th, 5th, 8th, 9th, 12th, 13th, 16th, and 17th pages are assigned to the back of a leaf.
Figure 15A:
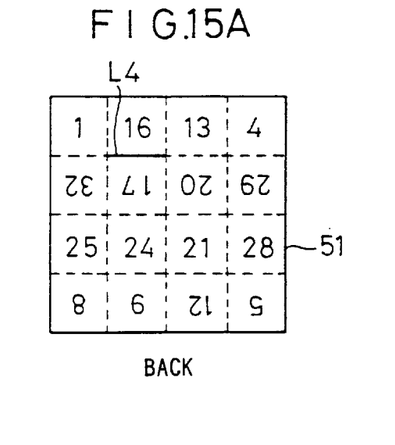
FIG. 15A is a diagram of a pagination scheme in which the pagination of the back of a leaf is completed.
Figure 15B:
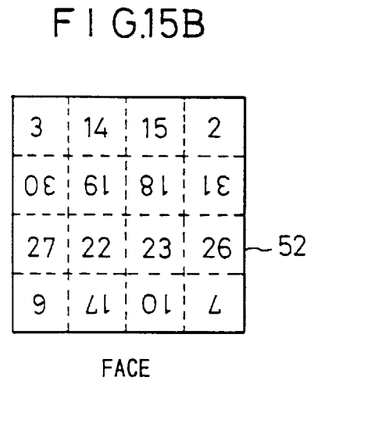
FIG. 15B is a diagram of a pagination scheme in which the pagination of the face of a leaf is completed.

Thereafter, for folding the leaf three times, the leaf is automatically paginated for 11th through 16th pages as shown in FIGS. 13A and 13B. For folding the leaf four times, since only one rectangle is available which will face the 16th page, that rectangle is determined as a 17th page, as shown in FIG. 14, and a fold line L4 is also determined. The leaf is then automatically paginated for 18th through 32 pages in step S11, as shown in FIGS. 15A and 15B.

As described above, according to the above first embodiment, a printed material is displayed as a leaf on the display screen, and the number of rectangles corresponding to the number of pages in a matrix on one of the face and back of the leaf is designated in step S1. A desired one of the rectangles is designated as a 1st page in step S3, and the rectangle on the reverse side which corresponds to the 1st page is designated as a 2nd page in step S4. A desired rectangle which will face the 2nd page when the leaf is folded once is designated as a 3rd page in step S5. The rectangle on i the reverse side which corresponds to the 3rd page is designated as a 4th page in step S6. A desired rectangle which will face the 4th page when the leaf is folded twice is designated as a 5th page in step S7. The rectangle on the reverse side which corresponds to the 5th page is designated as a 6th page in step S8. A rectangle which will face the 6th page when the leaf is folded twice is designated as a 7th page, and the rectangle on the reverse side which corresponds to the 7th page is designated as an 8th page in step S9. A rectangle which will face the 8th page when the leaf is folded three times is designated as a 9th page in step S10.

In this manner, the leaf is paginated for all pages. Until all 32 pages on the face and back of a single leaf are determined, the operator is only required to operate the data entry units including the mouse 31, the keyboard 32, and the tablet 33 to designate four pages, i.e., a 1st page, a 3rd or 4th page, a 5th or 6th page, and a 9th or 10th page. Accordingly, the manual process of entering page numbers is greatly simplified. Since determined fold lines are fold lines L1–L4 about which the leaf can actually be folded, page numbers can reliably be set up, preventing the operator from making page number setup errors.

If there are a plurality of leaves, then the second leaf may easily be paginated by adding the total number of pages on the first leaf to each of the page numbers assigned to the first leaf. Specifically, when a 1st page on the second leaf is designated as a 33rd page, a 32nd page as a final page on the second leaf is immediately determined as a 6th page. The third and other leaves can be paginated in the same manner as the second leaf.

Figure 16:
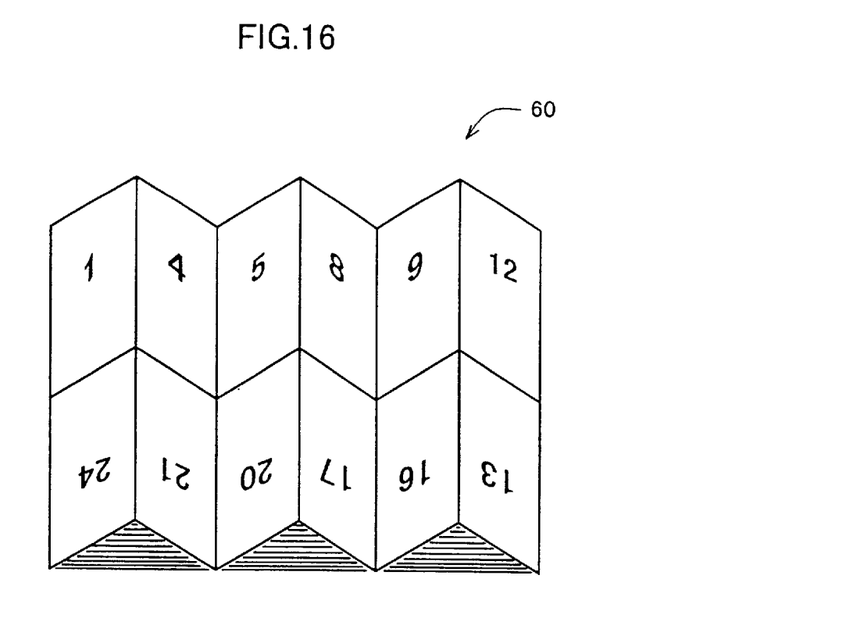
FIG. 16 is a diagram illustrative of pages assigned to a printed material with accordion folds.

A process of paginating a printed material 60 including accordion folds as shown in FIG. 16, according to a second embodiment of the present invention, will be described below.

Figure 17:
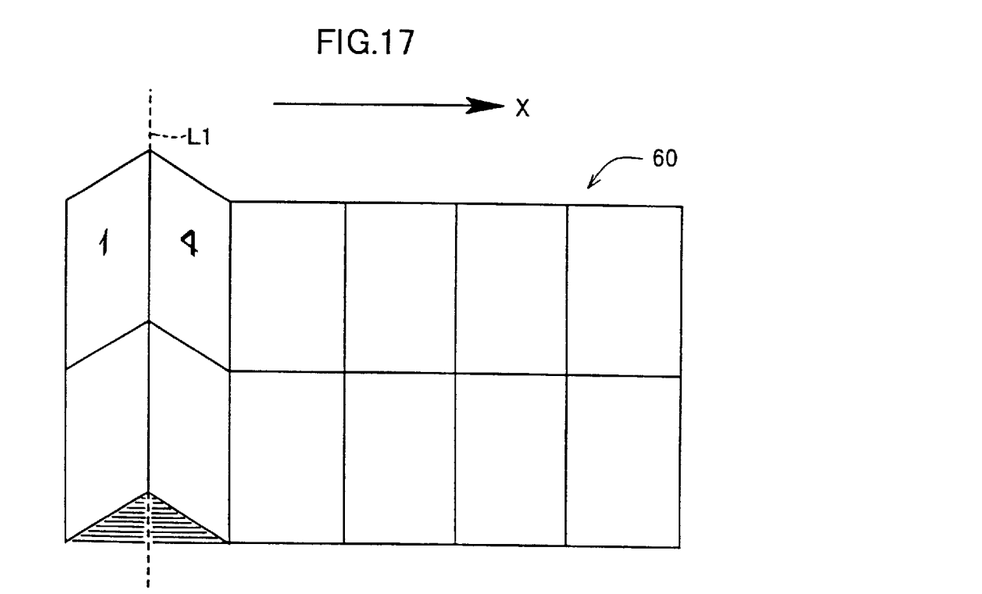
FIG. 17 is a diagram showing a 1st fold involving 1st through 4th pages on the printed material with accordion folds shown in FIG. 16.

When a 1st page is entered on the face of a leaf, as shown in FIG. 17, a 2nd page on the back of the leaf is automatically determined. Then, a 4th page is entered on the face of the leaf. When the 4th page is entered, a 3rd page on the back of the leaf is automatically determined, and a peak fold line L4 is automatically determined, as shown in FIG. 17. If the back of the leaf is also displayed, then a 2nd page and then a 3rd page may be entered.

Figure 18:
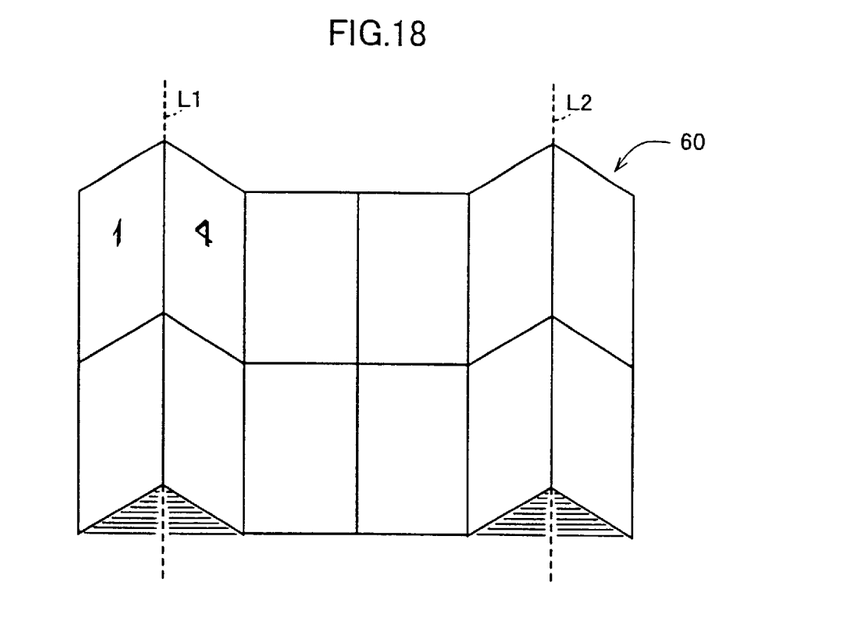
FIG. 18 is a diagram showing the estimation of a 2nd fold on the printed material with accordion folds shown in FIG. 16.

In FIG. 7, the leaf has such a matrix of rectangles that the number of pages in the direction indicated by the arrow x, i.e., in a horizontal direction, is 6 (even number), and the leaf is not folded to half about the fold line L1. Therefore, the leaf is determined as being folded into accordion folds, and it is possible to estimate that the leaf can be folded about a peak fold line L2, as shown in FIG. 18.

Figure 19:
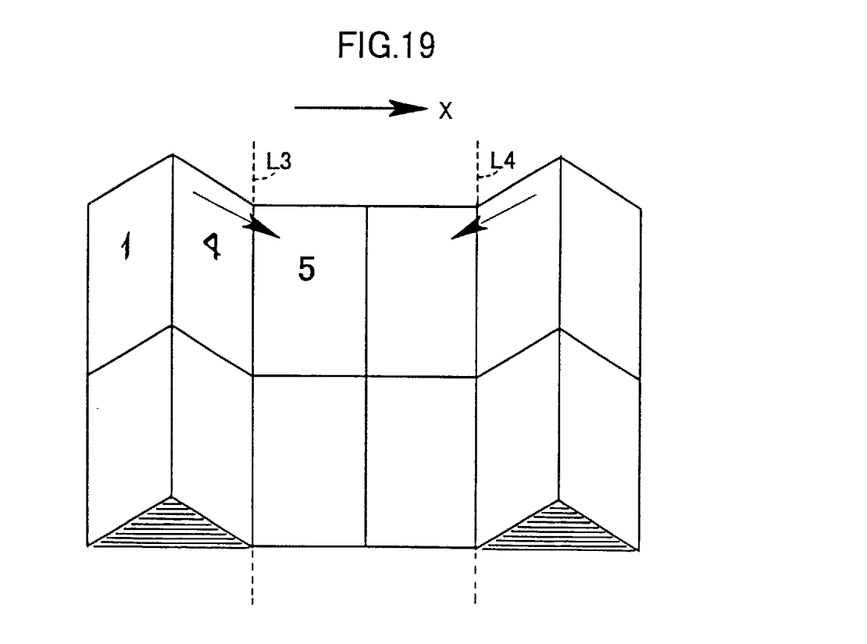
FIG. 19 is a diagram showing the determination of a 5th page, a 3rd fold, and a 4th fold on the printed material with accordion folds shown in FIG. 16.

When a 5th page is determined on the face of the leaf, as shown in FIG. 19, a 6th page on the back of the leaf is automatically determined, determining a valley fold line L3. Since the number of pages in the direction indicated by the arrow x is 4 (even number) before the leaf is folded about the fold line L3 and the leaf is not folded to half, it is possible to estimate that the leaf can be folded about a valley fold line L4.

Figure 20:
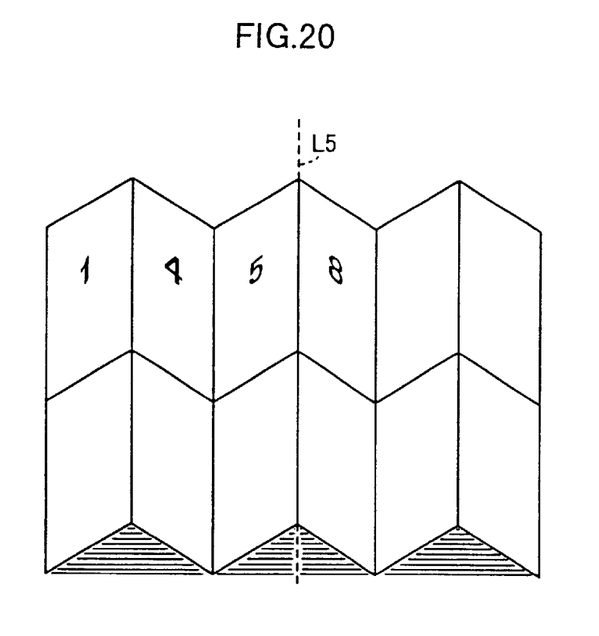
FIG. 20 is a diagram showing the determination of up to a 5th fold on the printed material with accordion folds shown in FIG. 16.
Figure 21:
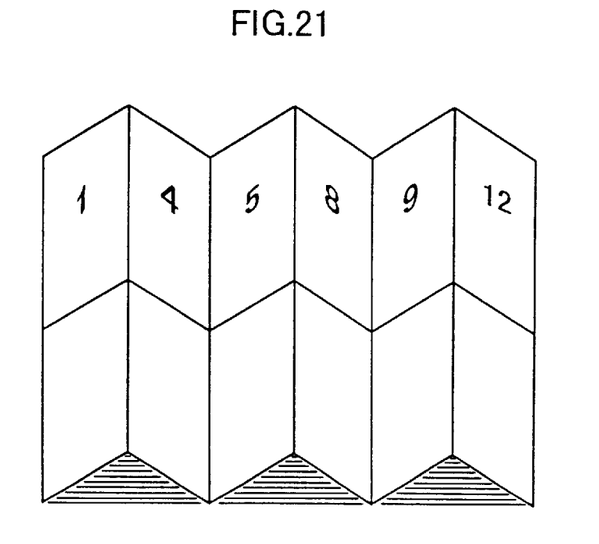
FIG. 21 is a diagram showing the determination of up to a 12th page by entering a 7th page or an 8th page on the printed material with accordion folds shown in FIG. 16.

Then, a 7th page or an 8th page is entered. If an 8th page is entered on the face of the leaf, as shown in FIG. 20, then a 7th page on the back of the leaf is automatically determined, determining a peak fold line L5. Inasmuch as the fold lines L2, L4 have already been estimated for pages positionally laterally of the 8th page in the direction indicated by the arrow x, the leaf is automatically paginated up to 12th pages as shown in FIG. 21.

Figure 22:
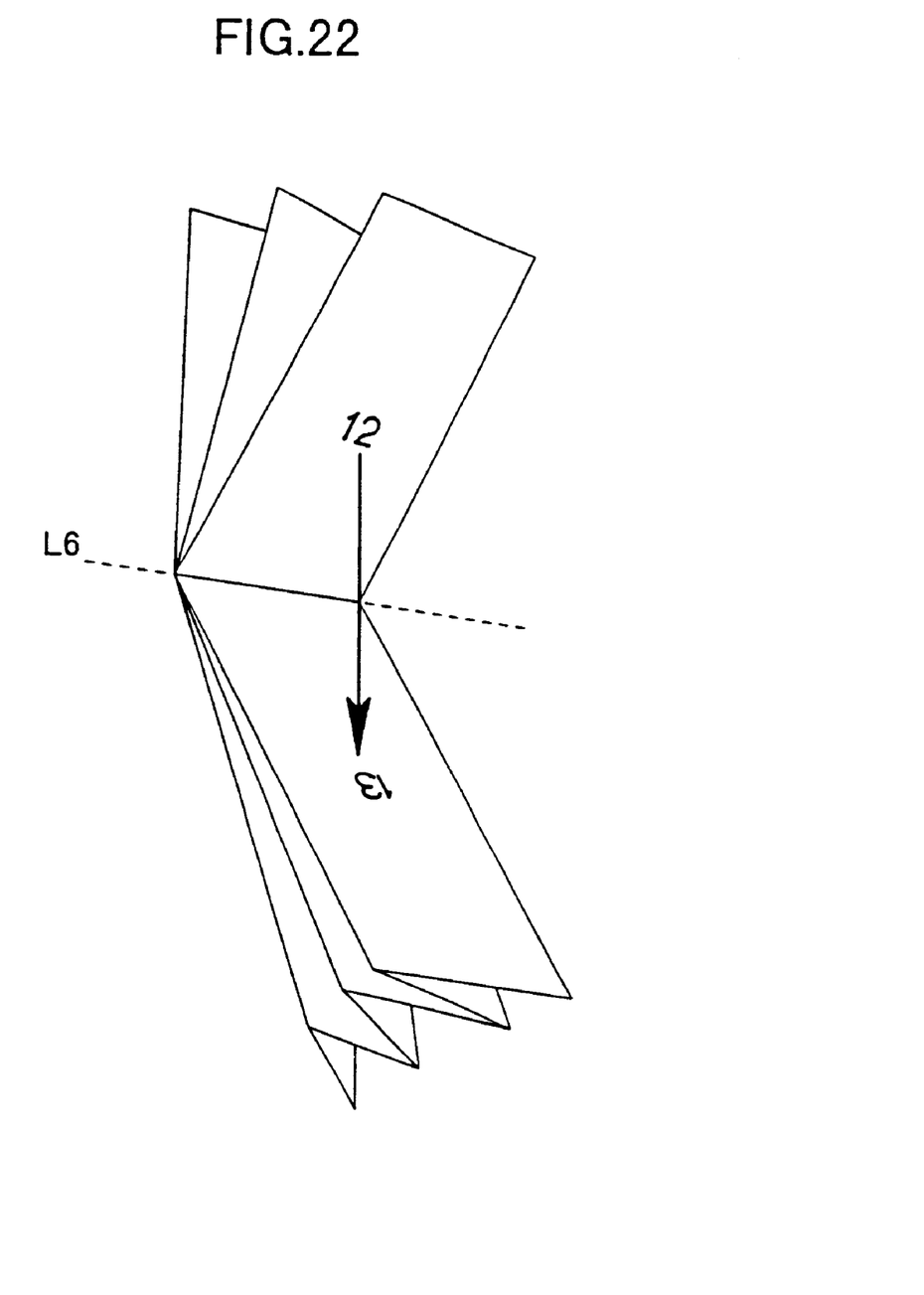
FIG. 22 is a diagram showing the determination of up to a 6th fold on the printed material with accordion folds shown in FIG. 16.

As shown in FIG. 22, a 13th page is automatically determined, and a fold line L6 is also determined. Therefore, 14th through 24th pages are automatically determined. As described above, the printed material 60 with accordion folds as shown in FIG. 16 can automatically paginated for all 24 pages and fold lines L1–L6 are automatically determined by designating four pages.

FIGS. 23A through 23F illustrates a process of paginating a printed material 61 including accordion folds according to a third embodiment of the present invention.

Figure 23A:
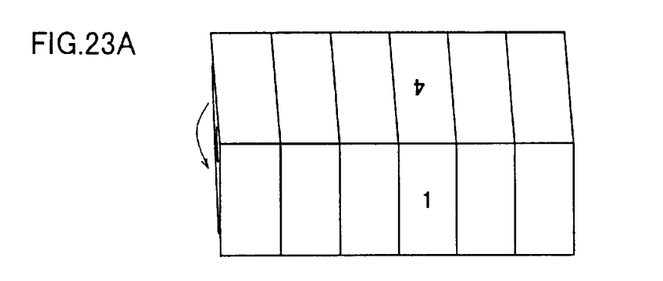
FIG. 23A is a diagram showing the determination of up to 4th and 1st pages on another printed material with accordion folds.
Figure 23B:
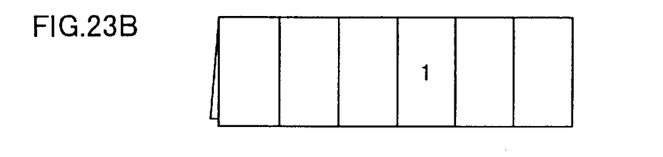
FIG. 23B is a diagram showing a 1st fold on the printed material with accordion folds shown in FIG. 23A.

As shown in FIG. 23A, when a 1st page and then a 4th page on a leaf are entered, 1st through 4th pages are automatically determined, and a 1st fold line is automatically determined for folding the leaf as shown in FIG. 23B.

Figure 23C:
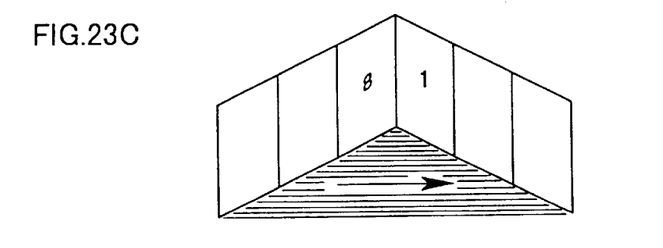
FIG. 23C is a diagram showing the estimation of an 8th page and a 2nd fold on the printed material with accordion folds shown in FIG. 23A.
Figure 23D:
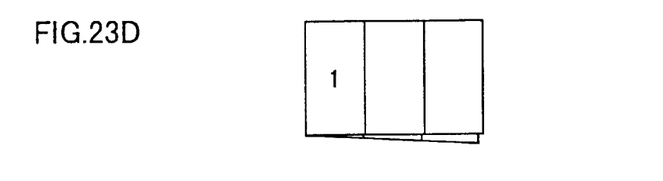
FIG. 23D is a diagram showing a 2nd fold on the printed material with accordion folds shown in FIG. 23A.
Figure 23E:
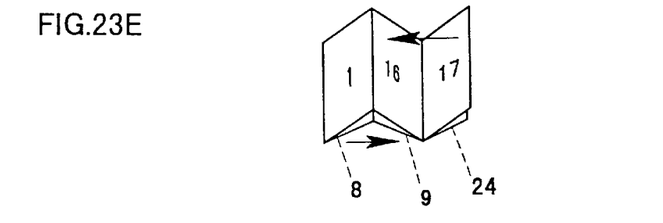
FIG. 23E is a diagram showing the estimation of according folds on the printed material shown in FIG. 23A.
Figure 23F:
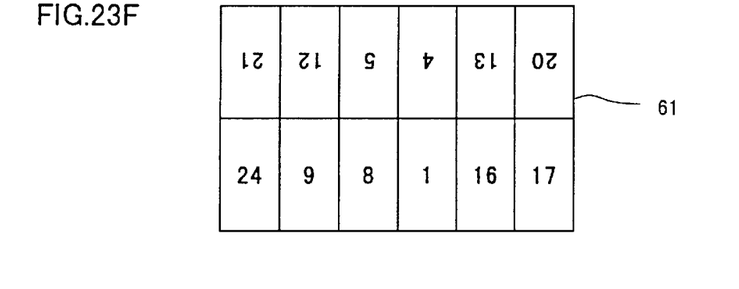
FIG. 23F is a diagram showing the printed material shown in FIG. 23A, as unfolded, after its pagination is finished.

Then, when a 5th page is entered, 5th through 8th pages are determined, and a 2nd fold line is estimated, as shown in FIGS. 23C and 23D. When a 9th page is entered next to the 8th page, as shown in FIG. 23E, 2nd and 3rd fold lines are determined, and pages up to a final 24th page are determined, as shown in FIGS. 23E and 23F.

If the leaf can be folded into so-called parallel folds, then a 9th page is entered next to a page next to the 1st page in FIG. 23D, and the page next to the 1st page is determined as a final 24 page in FIG. 23D. To form parallel folds, a one-third, including the 9th page, on the right of the folded leaf shown in FIG. 23D is folded inwardly, and a one-third, including the 1st page, on the left of the folded leaf is folded inwardly, producing 1st through 24 pages successively arranged toward the viewer of FIG. 23D.

As described above, according to the present invention, when a page number on a leaf is entered, the computer calculates an actual fold of the leaf. That is, the computer calculates a final page that is automatically determined by the designation of a page. Specifically, when a 1st page is designated, the computer determines up to a 2nd page. When a 3rd or 4th page is entered, the computer determines up to the 4th page. When up to a 5th page is entered, the computer determines up to an 8th page. If the final page does not corresponds to, i.e., reaches, a desired page number, then a page next to the presently final page or a page next to the page that is next to the presently final page is entered, and the computer decides whether a calculated final page corresponds to, i.e., reaches, the desired page number.

For example, when a 5th or 6th page is entered, up to an 8th page is determined, and when a 9th or 10th page is entered, up to a 32nd page is determined. When a 33rd or 34th page is entered, up to a 64th page is determined.

According to the present invention, when the operator designates pages (page numbers) on a leaf, the computer automatically determines fold lines on the leaf. Therefore, for assigning pages (page numbers) to a leaf, the operator is not required to refer to folding specifications, but can easily and accurately paginate the leaf.

Stated otherwise, the operator is not required to designate and enter fold lines. Accordingly, the process of paginating a leaf is highly simplified and made efficient.

Although certain preferred embodiments of the present invention have been shown and described in detail, it should be understood that various changes and modifications may be made therein without departing from the scope of the appended claims.

What is claimed is:

1. A method of determining a folding pattern for an unfolded leaf and paginating a printed material by displaying an unfolded leaf and assigning page numbers to pages on a face side and a back side of the unfolded leaf according to a program executed by a computer, comprising the steps of:

(a) designating a number of rectangles on each of the face side and back side of the unfolded leaf, wherein the rectangles correspond to the number of pages in a matrix;

(b) selecting one of said rectangles as a 1st page on either one of the face side and back side of the unfolded leaf, and selecting the rectangle on the opposite side of the 1st page as a 2nd page;

(c) selecting one of said rectangles which will face said 2nd page when the leaf is folded along a first fold line, as a 3rd page, and selecting the rectangle on the opposite side of the 3rd page as a 4th page, wherein in step (c), said step of selecting said one of said rectangles as the 3rd page includes selecting one of a plurality of possible fold lines; and (d) selecting one of said rectangles which will face said 4th page when the leaf is folded along a second fold line, as a 5th page, and selecting the rectangle on the opposite side of the 5th page as a 6th page, wherein in step (d), said step of selecting said one of said rectangles as the 5th page includes selecting one of a plurality of possible fold lines, wherein at least some of remaining ones of said rectangles are automatically paginated by the computer.

2. A method according to claim 1, further comprising the step of:

(e) selecting one of said rectangles which will face said 6th page when the leaf is folded twice, as a 7th page, and selecting the rectangle on the opposite side of the 7th page as an 8th page.

3. A method according to claim 2, further comprising the step of:

(f) selecting one of said rectangles which will face said 8th page when the leaf is folded three times, as a 9th page, and selecting the rectangle on the opposite side of the 9th page as a 10th page.

4. A method according to claim 1, wherein said step (c) comprises the step of displaying rectangles which can face said 2nd page in a predetermined pattern, and said step (d) comprises the step of displaying rectangles which can face said 4th page in a predetermined pattern.

5. A method of determining a folding pattern for an unfolded leaf and paginating a printed material by displaying an unfolded leaf and assigning page numbers to pages on a face side and a back side of the unfolded leaf according to a program executed by a computer, comprising the steps of:

(a) designating a number of rectangles on each of the face side and back side of the unfolded leaf, wherein the rectangles correspond to the number of pages in a matrix;

(b) selecting one of said rectangles as a 1st page on either one of the face side and back side of the unfolded leaf, and selecting the rectangle on the opposite side of the 1st page as a 2nd page;

(c) selecting one of said rectangles which will face said 1st page across said 2nd page when the leaf is folded once, as a 4th page, and selecting the rectangle on the opposite side of the 4th page as a 3rd page, wherein in step (c), said step of selecting said one of said rectangles as the 4th page includes selecting one of a plurality of possible fold lines; and (d) selecting one of said rectangles which will face said 4th page when the leaf is folded twice, as a 5th page, and selecting the rectangle on the opposite side of the 5th page as a 6th page, wherein in step (d), said step of selecting said one of said rectangles as the 5th page includes selecting one of a plurality of possible fold lines, wherein at least some of remaining ones of said rectangles are automatically paginated by the computer.

6. A method according to claim 5, further comprising the step of:

(e) selecting one of said rectangles which will face said 6th page when the leaf is folded twice, as a 7th page, and selecting the rectangle on the opposite side of the 7th page as an 8th page.

7. A method according to claim 6, further comprising the step of:

(f) selecting one of said rectangles which will face said 8th page when the leaf is folded three times, as a 9th page, and selecting the rectangle on the opposite side of the 9th rage as a 10th page.

8. A method according to claim 5, wherein said step (c) comprises the step of displaying rectangles which can face said 1st page across said 2nd page in a predetermined pattern, and said step (d) comprises the step of displaying rectangles which can face said 4th page in a predetermined pattern.

9. A method of determining a folding pattern for an unfolded leaf and paginating a printed material by displaying an unfolded leaf and assigning page numbers to pages on a face side and a back side of the unfolded leaf according to a program executed by a computer, comprising the steps of:

(a) designating a number of rectangles on each of the face side and back side of the unfolded leaf, wherein the rectangles correspond to the number of pages in a matrix;

(b) selecting one of said rectangles as a 1st page on either one of the face side and back side of the unfolded leaf, and selecting the rectangle on the opposite side of the 1st page as a 2nd page;

(c) selecting one of said rectangles which will face said 2nd page when the leaf is folded once, as a 3rd page, and selecting the rectangle on the opposite side of the 3rd page as a 4th page, wherein in step (c), said step of selecting said one of said rectangles as the 3rd page includes selecting one of a plurality of possible fold lines; and (d) selecting one of said rectangles which will face said 3rd page across said 4th page when the leaf is folded twice, as a 6th page, and selecting the rectangle on the opposite side of the 6th page as a 5th page, wherein in step (d), said step of selecting said one of said rectangles as the 6th page includes selecting one of a plurality of possible fold lines, wherein at least some of remaining ones of said rectangles are automatically paginated by the computer.

10. A method according to claim 9, further comprising the step of:

(e) selecting one of said rectangles which will face said 6th page when the leaf is folded twice, as a 7th page, and selecting the rectangle on the opposite side of the 7th page as an 8th page.

11. A method according to claim 10, further comprising the step of:

(f) selecting one of said rectangles which will face said 8th page when the leaf is folded three times, as a 9th page, and selecting the rectangle on the opposite side of the 9th page as a 10th page.

12. A method according to claim 9, wherein said step (c) comprises the step of displaying rectangles which can face said 2nd page in a predetermined pattern, and said step (d) comprises the step of displaying rectangles which can face said 3rd page across said 4th page in a predetermined pattern.

13. A method of determining a folding pattern for an unfolded leaf and paginating a printed material by displaying an unfolded leaf and assigning page numbers to pages on a face side and a back side of the unfolded leaf according to a program executed by a computer, comprising the steps of:

(a) designating the number of rectangles on each of the face side and back side of the unfolded leaf, wherein the rectangles correspond to the number of pages in a matrix;

(b) selecting one of said rectangles as a 1st page on either one of the face side and back side of the unfolded leaf, and selecting the rectangle on the opposite side of the 1st page as a 2nd page;

(c) selecting one of said rectangles which will face said 1st page across said 2nd page when the leaf is folded once, as a 4th page, and selecting the rectangle on the opposite side of the 4th page as a 3rd page, wherein in step (c), said step of selecting said one of said rectangles as the 4th page includes selecting one of a plurality of possible fold lines; and (d) selecting one of said rectangles which will face said 3rd page across said 4th page when the leaf is folded twice, as a 6th page, and selecting the rectangle on the opposite side of the 6th page as a 5th page, wherein in step (d), said step of selecting said one of said rectangles as the 6th page includes selecting one of a plurality of possible fold lines wherein at least some of remaining ones of said rectangles are automatically paginated by the computer.

14. A method according to claim 13, further comprising the step of:

(e) selecting one of said rectangles which will face said 6th page when the leaf is folded twice, as a 7th page, and selecting the rectangle on the opposite side of the 7th page as an 8th page.

15. A method according to claim 14, further comprising the step of:

(f) selecting one of said rectangles which will face said 8th page when the leaf is folded three times, as a 9th page, and selecting the rectangle on the opposite side of the 9th page as a 10th page.

16. A method according to claim 13, wherein said step (c) comprises the step of displaying rectangles which can face said 1st page across said 2nd page in a predetermined pattern, and said step (d) comprises the step of displaying rectangles which can face said 3rd page across said 4th page in a predetermined pattern.

* * * * *